(12) United States Patent  (10) Patent No.: US 7,784,572 B2
Bald et al.  (45) Date of Patent: Aug. 31, 2010

(54) DRIVE UNIT FOR AN INDUSTRIAL TRUCK

(75) Inventors: Dirk Bald, Gotha (DE); Matthias Habel, Gotha (DE); Peter Streipardt, Waltershausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 284 days.

(21) Appl. No.: 11/911,385

(22) PCT Filed: Apr. 4, 2006

(86) PCT No.: PCT/EP2006/003039

§ 371 (c)(1),
(2), (4) Date: Oct. 12, 2007

(87) PCT Pub. No.: WO2006/108531

PCT Pub. Date: Oct. 19, 2006

(65) Prior Publication Data

US 2008/0190686 A1  Aug. 14, 2008

(30) Foreign Application Priority Data

Apr. 15, 2005 (DE) .................. 10 2005 017 737

(51) Int. Cl.
*B60G 7/00* (2006.01)

(52) U.S. Cl. ..................................... 180/13; 180/65.51

(58) Field of Classification Search .................. 180/11, 180/12, 13, 65.51
See application file for complete search history.

(56) References Cited

U.S. PATENT DOCUMENTS

| 6,854,555 | B2 | 2/2005 | Raue | |
| 7,591,340 | B2* | 9/2009 | Scharfenberg et al. | 180/252 |
| 2003/0006084 | A1 | 1/2003 | Raue | |
| 2007/0119649 | A1* | 5/2007 | Manken et al. | 180/446 |

FOREIGN PATENT DOCUMENTS

| DE | 101 48 457 A1 | 4/2003 |
| DE | 102 41 420 A1 | 3/2004 |
| DE | 103 28 651 A1 | 1/2005 |
| DE | 10 2004 006 722 A1 | 9/2005 |
| EP | 490673 A1 * | 6/1992 |
| EP | 0 697 759 A1 | 2/1996 |
| EP | 1 334 895 A1 | 2/2003 |
| WO | WO-98/19875 | 5/1998 |

* cited by examiner

*Primary Examiner*—Kevin Hurley
(74) *Attorney, Agent, or Firm*—Davis & Bujold, P.L.L.C.

(57) ABSTRACT

A drive unit (1) for an industrial truck comprises a drive motor (2), an electronic steering mechanism (3) being arranged at the periphery thereof. In this way, the drive unit (1) is configured such that it is simpler to assemble and more reliable to operate due to less wiring.

12 Claims, 3 Drawing Sheets

DRIVE UNIT FOR AN INDUSTRIAL TRUCK

This application is a national stage completion of PCT/EP2006/003039 filed Apr. 4, 2006, which claims priority from German Application Serial No. 10 2005 017 737.9 filed Apr. 15, 2005.

FIELD OF THE INVENTION

The invention relates to a drive unit, particularly for an industrial truck.

BACKGROUND OF THE INVENTION

Drive units of a generic kind comprise an electric drive motor, which drives a drive wheel by way of a reducing gear so as to drive the vehicle in a driving motion.

DE 102 41 420 A1 discloses a drive unit for an industrial truck in which a horizontally arranged drive motor drives a drive wheel by way of a reducing gear, wherein a converter is arranged inside the motor housing. This extends the motor in the vertical direction, whereby the motor can only be installed in vehicles with larger available space.

DE 10 2004 006 722.8 by the Applicant discloses a drive unit for an industrial truck in which the drive motor with a steering motor are co-axially arranged and the motors are arranged vertically in the vehicle.

It is, therefore, the object of the invention to create a drive unit, particularly for industrial trucks, which can be installed in the vehicle in a simple manner and is characterized by high operational reliability.

SUMMARY OF THE INVENTION

According to the invention, the drive unit comprises an electronic steering mechanism, which is arranged on or in the housing of the drive motor and, in the case of horizontally arranged drive motors, also in the gear housing.

In this way, it is possible to create a drive system which, as a result of less wiring and simple plug connections, is characterized by high operational reliability and simpler installation of the system, because only lines for the power supply and signal lines to the drive unit are required. By arranging the electronic steering mechanism, in the case of a vertical motor, at the periphery thereof and, in the case of a horizontal motor, in the gear housing, the length of the overall vehicle, particularly the length behind the forks, is not increased. The drive unit can be used for electrically driven vehicles, such as those used as warehouse equipment, 3-wheel counterbalanced trucks or automated guided vehicle systems, such as self-propelled cleaning machines and industrial trucks.

In a further embodiment of the invention, the electronic steering mechanism is made of an inverter, comprising power electronics and signal electronics. Depending on the available installation space in the vehicle, the power electronics and signal electronics, however, may be integrated in a common housing on the drive motor, in the housing of the drive motor or may be spatially separated on or in the drive motor. If the drive unit additionally comprises a drive motor as the propulsion motor and a drive motor as the steering motor, it is possible to arrange the power electronics of the steering motor and the power electronics of the drive motor to be spatially separated on the drive motor and spatially combine the signal electronics of the steering motor and the signal electronics of the drive motor and likewise arrange these on the drive motor.

BRIEF DESCRIPTION OF THE DRAWINGS

The invention will now be described, by way of example, with reference to the accompanying drawings in which.

DETAILED DESCRIPTION OF THE INVENTION

Figure 1:
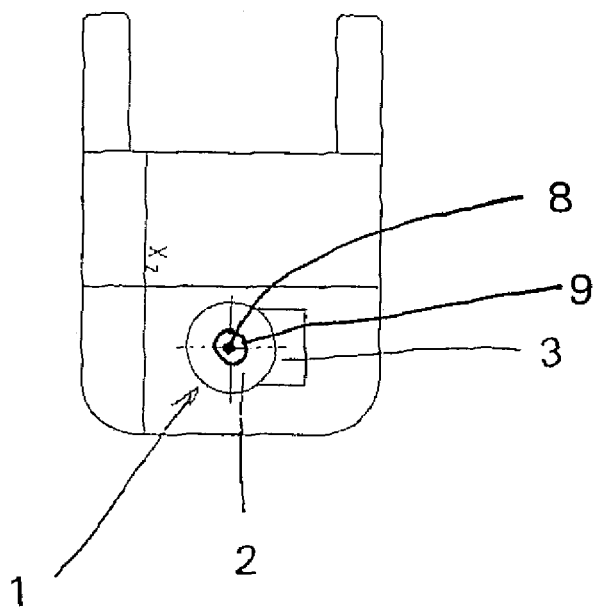
FIG. 1 is a schematic illustration of an industrial truck with the vehicle motor arranged in the center.
Figure 2:
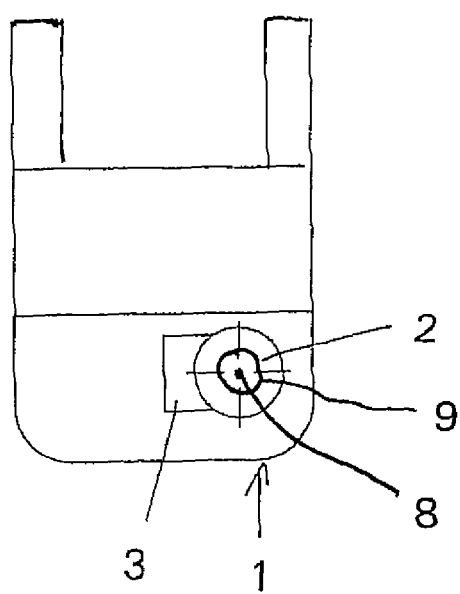
FIG. 2 is a schematic illustration of an industrial truck with the vehicle motor arranged on the side.

FIG. 1:

An installation space for a drive unit 1 is very limited, particularly in the vehicle's longitudinal direction. Extending the length of the vehicle could negatively impact its mobility in small spaces, which is required, for example, in narrow aisles, between racks or on freight vehicles. Since the length of the battery tank cannot be modified, the length of the vehicle is determined by the installation space required for the drive system. In addition, further components, such as the hydraulic actuator or the oil tank, must be installed in the vehicle. A drive motor 2, which may be configured as a three-phase motor, is arranged vertically in the vehicle. In vehicles in which the drive motor 2 is connected in a rotationally fixed manner to the vehicle and, therefore, does not rotate during a steering motion, an electronic steering mechanism 3 should be installed on the side of the drive motor directed toward the vehicle side and, therefore, facing away from the sides in the vehicle's longitudinal direction. As a result, the vehicle's length is not increased in the longitudinal direction. The electronic steering mechanism 3 may be connected to the housing of the drive motor 2; however, it is also conceivable to integrate the electronic steering mechanism 3 in the housing of the drive motor 2. If the drive motor 2 is arranged in the center, it is possible to install the electronic steering mechanism 3 on the right or left side, depending on the location of the vehicle's hydraulic components, which occupy some installation space. The electronic steering mechanism 3 can be arranged opposite from the hydraulic components, however, in the direction of the vehicle side and not in the longitudinal direction of the vehicle. It is also possible to divide the electronic steering mechanism 3 into a plurality of components and arrange these on opposing sides of the drive motor, however, in the direction of the vehicle side. The components may have different lengths and should be configured wider and shorter or narrower and longer, depending on the installation space.

FIG. 2:

In vehicles in which the drive unit 1 is arranged on one side of the vehicle and the drive motor is configured as a non-rotating motor, in the sense of a steering motion, the electronic steering mechanism 3 should be arranged on one side on the drive motor 2, toward the direction of the vehicle's center. In this way, the maximum track width is guaranteed, thus achieving the best possible stability of the vehicle. The drive motor comprises a shaft (9), which rotates about an axis of rotation (8).

FIG. 3:

In vehicles in which the drive motor 2 rotates during a steering motion, such as in drawbar-guided devices, the steering mechanism should be distributed about the motor housing such that the steering mechanism evenly increases the radius of the motor 2, whereby the steering mechanism 3 does not interfere with other components of the vehicle during a rotation of the motor 2.

Figure 3:
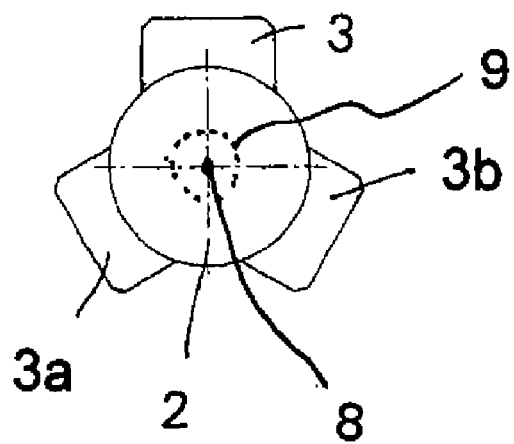
FIG. 3 is a schematic illustration of a vertically arranged vehicle motor.
Figure 4:
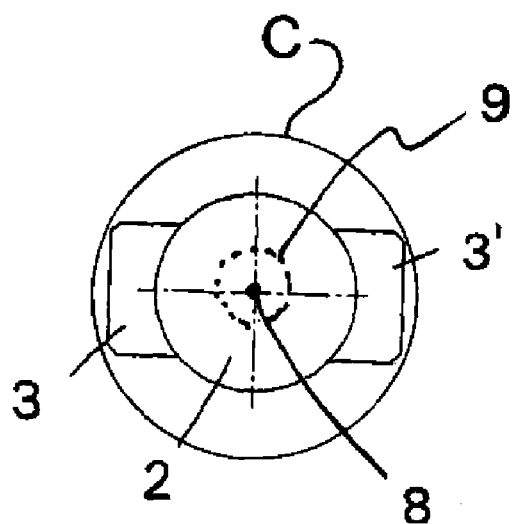
FIG. 4 is a schematic illustration of a vertically arranged vehicle motor.
Figure 5:
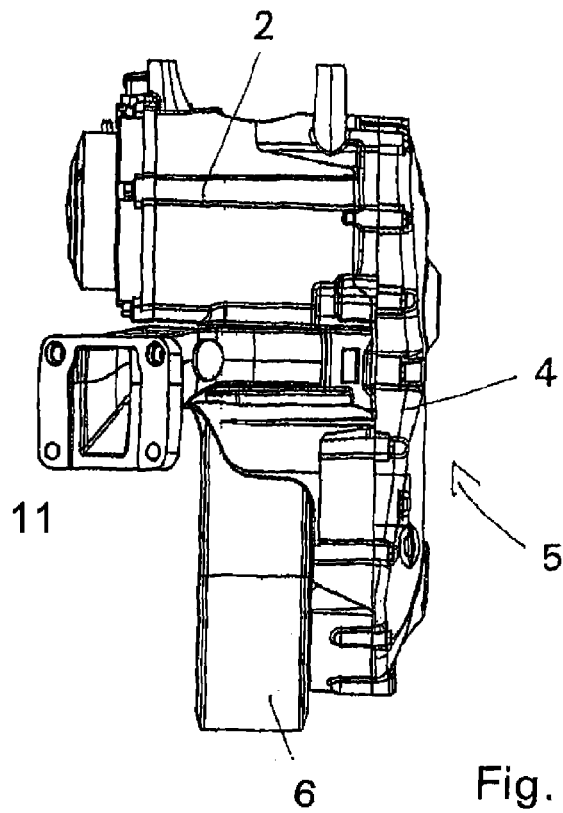
FIG. 5 is a view of a drive unit with a horizontally arranged vehicle motor.
Figure 6:
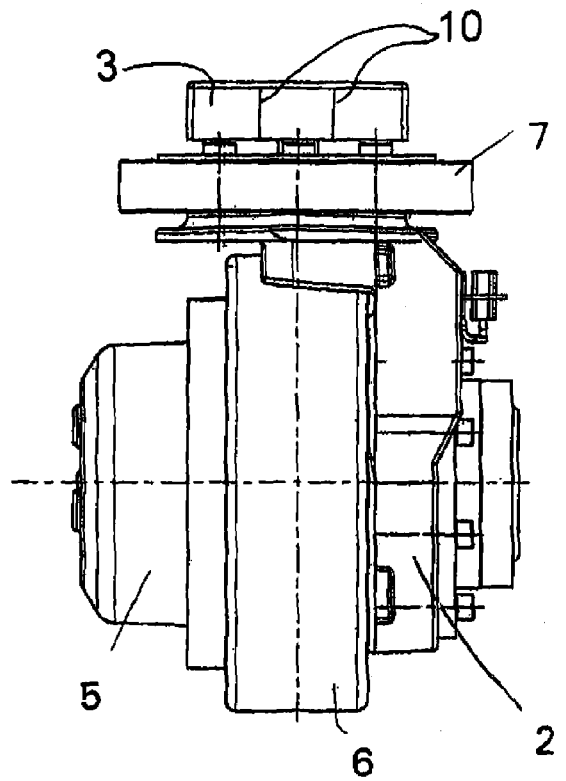
FIG. 6 is a view of a vehicle motor arranged horizontally in the vehicle wheel.

In the embodiment according to FIG. 3, the steering mechanism 3 is divided into three components, which are distributed evenly about the axis of rotation of the drive motor 2. Again, it is possible to connect the steering mechanism 3 to the housing of the drive motor 2 or configure the housing of the drive motor 2 such that the steering mechanism 3 is integrated therein. It is likewise possible to separate the steering mechanism 3 into an individual controller of power electronics 3a and an individual controller of signal or steering electronics 3b.

FIG. 4:

The drive motor 2 is configured like the drive motor in FIG. 3 as a rotating motor during steering motions, the steering mechanism 3, however, is configured with respect to its dimensions such that it can be arranged inside the minimum circumscribed circle C, whereby the electronic steering mechanism 3 can be divided into two components or steerages 3, 3', which are provided opposite from one another on the periphery of the drive motor 2. It is likewise possible in drives with rotating motors to configure the electronic steering mechanism 3 such that it completely encompasses the periphery of the drive motor 2. By arranging the electronic steering mechanism 3 on the periphery of the drive motor 2, the drive motor 2 is not extended in the vertical direction, which is not possible in the case of drive systems with rotating motors, due to the small installation space in the vertical direction as a result of a steering mechanism vertically arranged above the motor.

FIG. 5:

In the case of drives with a horizontal motor 2, the electronic steering mechanism 3 is arranged in or on a gear housing 4 of a reducing gear 5. In this way, it is possible to accommodate the electronic steering mechanism 3 inside the minimum circumscribed circle C of the motor-gear unit. Likewise, by integrating the electronic steering mechanism 3 in the gear housing 4 or in the housing cover, it is possible to cool the electronic steering mechanism 3 with the lubricant of the reducing gear 5.

FIG. 6:

In the case of drive units with horizontal drive motors 2, which are arranged inside a drive wheel 6, the electronic steering mechanism 3 should not be provided inside the gear housing. These drive units offer the possibility of accommodating the electronic steering mechanism 3 inside or above a bearing 7 of the drive unit in the vehicle. In any case, the electronic steering mechanism 3 should be provided in this location such that the minimum circumscribed circle C, defined by the drive wheel, is not increased.

In a further embodiment of FIGS. 1 to 6, the electronic steering mechanism 3 is cooled by the lubricant and coolant of the drive motor 2 or the reducing gear 5. The entire surface of the gear housing is used for heat dissipation, whereby the cooling lubricant is cooled and then is available again for absorbing heat from the electronic steering mechanism 3. Since the electronic steering mechanism 3 heats the cooling lubricant, the reducing gear 5 and/or the coolant and lubricant lubricating the reducing gear 5 is also heated more quickly, resulting in improved efficiency, particularly during the starting phase of the vehicle.

In a further embodiment of the invention, it is possible to additionally cool the housing of the electronic steering mechanism 3 or the housing in the region of the electronic steering mechanism 3 by cooling fins 10. Likewise, it is possible to integrate ducts 11 in the housing of the drive unit 1, through which coolant or cooling air flows in order to cool the electronic steering mechanism 3. Alternatively, the drive motor 2 and the electronic steering mechanism 3 may be simultaneously cooled by a common medium (not shown).

According to the invention, a drive unit for an industrial truck can be created, which is characterized by less wiring, lower proneness to failure, especially as a result of the reduced number of plug and screw contacts, as well as by simpler installation.

REFERENCE NUMERALS 1 drive unit
2 drive motor
3 electronic steering mechanism 3
3a individual controller of power electronics
3b individual controller of signal or steering electronics
4 gear housing
5 reducing gear
6 drive wheel
7 bearing
8 axis of rotation
9 shaft
10 cooling fins
11 duct

The invention claimed is:

1. A drive unit for an industrial vehicle, the drive unit includes a drive motor (2) comprising:
   a shaft (8), rotating about an axis of rotation (9), which drives a drive wheel (6) by way of a reducing gear (5),
   the drive motor (2) being disposed vertically in the vehicle following installation of the drive motor (2), and the drive wheel (6) being rotatable to achieve a steering motion of the vehicle, while the drive motor (2), during the steering motion, remains connected to the vehicle in a rotationally fixed manner,
   an electronic steering mechanism (3) being one of arranged on and arranged in a housing of the drive motor (2), parallel to the axis of rotation (9) of the shaft (8), and
   the electronic steering mechanism (3), following installation, being disposed on a side of the drive motor facing toward a side of the vehicle so as to avoid increasing a longitudinal length of the vehicle in a longitudinal direction.

2. The drive unit according to claim 1, wherein the electronic steering mechanism (3) is arranged along the longitudinal direction of the vehicle, a minimum circumscribed circle (C) defined by the drive wheel (6).

3. The drive unit according to claim 1, wherein, when the drive unit is disposed on the side of the vehicle, the electronic steering mechanism (3) is disposed adjacent a center of the vehicle.

4. The drive unit according to claim 1, wherein the electronic steering mechanism (3) is divided into at least two individual steerages which are each distributed on a periphery of the drive motor (2), in a direction toward at least one of the vehicle.

5. The drive unit according to claim 4, wherein the electronic steering mechanism (3) is divided into an individual controller of power electronics (3a) and an individual controller of signal electronics (3b).

6. A drive unit, for an industrial vehicle, the drive unit includes a drive motor (2) comprising:
- a shaft (8), rotating about an axis of rotation (9), which drives a drive wheel (6) via a reducing gear (5), following installation the drive motor (2) being disposed vertically in the vehicle, and the drive wheel (6) being rotatable, to achieve steering of the vehicle, while the drive motor (2), during steering, follows a rotational motion of the vehicle wheel (6),
- an electronic steering mechanism (3) is one of arranged on and arranged in a housing of the drive motor (2), parallel to the axis of rotation (9) of the shaft (8), and
- the steering mechanism (3) is disposed about an axis of the motor.

7. The drive unit according to claim 1, wherein the electronic steering mechanism (3) is cooled by cooling lubricant of the drive unit (1).

8. The drive unit according to claim 1, wherein the electronic steering mechanism (3) comprises a housing which has cooling fins (10).

9. The drive unit according to claim 1, wherein a housing of the drive unit (1) comprises ducts (11) which extend in a longitudinal direction of the motor (2), and one of a flow of coolant and air passes through the ducts (11) for cooling the drive unit (1).

10. The drive unit according to claim 7, wherein the electronic steering mechanism (3) is one of disposed on and disposed in the motor housing parallel to the axis of rotation of the motor.

11. The drive unit according to claim 1, wherein the drive motor and the electronic steering mechanism (3) is simultaneously cooled via a common medium which provides external cooling.

12. A drive unit for an industrial vehicle comprising:
- a drive motor (2) communicating with a drive wheel (6), via a reduction gear (5), to provide the drive wheel (6) with rotation power, the drive motor (2), which is rotationally fixed to the industrial vehicle, has a shaft (8) that rotates about a vertical axis of rotation (9) such that the drive wheel (6) rotates to steer the industrial vehicle;
- an electronic steering mechanism (3) is one of arranged on and arranged in a housing of the drive motor (2) and is parallel to the vertical axis of rotation (9) of the shaft (8), and
- the electronic steering mechanism (3), following installation, being disposed on a side of the drive motor (2) facing a side of the industrial vehicle so as to avoid increasing a length longitudinal of the industrial vehicle.

* * * * *